United States Patent [19]

Cutler et al.

[11] Patent Number: 4,784,489
[45] Date of Patent: Nov. 15, 1988

[54] FIBER-OPTIC BASED REMOTE RECEIVER FOR LASER INTERFEROMETER SYSTEMS

[75] Inventors: Leonard S. Cutler, Los Altos Hills; Robin P. Giffard, Los Altos; William D. Holland, Palo Alto; Lawrence J. Wuerz, Santa Clara, all of Calif.

[73] Assignee: Hewlett-Packard Company, Palo Alto, Calif.

[21] Appl. No.: 43,906

[22] Filed: Apr. 29, 1987

[51] Int. Cl.⁴ ............................................. G01B 9/02
[52] U.S. Cl. .................................. 356/349; 356/351
[58] Field of Search .................... 356/349, 351, 358

[56] References Cited

U.S. PATENT DOCUMENTS 4,153,370 5/1979 Corey ................................. 356/358

FOREIGN PATENT DOCUMENTS 3428474 2/1986 Fed. Rep. of Germany ...... 356/358
1373645 11/1974 United Kingdom ................ 356/358

Primary Examiner—Davis L. Willis
Assistant Examiner—Matthew W. Koren
Attorney, Agent, or Firm—James M. Williams

[57] ABSTRACT

A remote receiver for laser interferometer systems is split into two parts connected by a fiber optic link. The front-end of the receiver, located near the remote interferometer optics, houses only the optical components for focusing and mixing the laser beam, and transmits the beam through an optical fiber cable. The back-end of the receiver, located remotely, houses the electronic components for detecting and measuring the frequency difference to produce the signal for the measurement electronics.

4 Claims, 2 Drawing Sheets

FIBER-OPTIC BASED REMOTE RECEIVER FOR LASER INTERFEROMETER SYSTEMS

BACKGROUND AND SUMMARY OF THE INVENTION

Laser interferometers are used in many applications requiring precise, high resolution displacement measurements. One popular type of laser interferometer is a two-frequency, or AC, laser interferometer system.

FIG. 1 shows a typical block diagram for an AC laser interferometer system, of the type suitable for use with the fiber optic based receiver of the invention. Other optical arrangements for the interferometer are possible and could also be used with the receiver of the invention to achieve similar results. In a simple linear measurement using this system, a two-frequency laser beam is split by a remote interferometer 13, so that a component with one frequency is reflected by a fixed reflector 17, and the other component with a different frequency is transmitted toward a movable reflector 19 mounted at the point whose movement is to be measured.

When reflector 19 is moved, a doppler shift is introduced into that beam's frequency. The magnitude of this doppler shift is proportional to the speed at which reflector 19 is moving. The beams are recombined and sent to a receiver 14 which measures the difference of the two frequencies and produces a MEASURE signal.

A portion of the original laser beam is sampled and detected in a similar manner by receiver 18 to produce a REFERENCE signal. The measurement electronics 16 compares the cumulative phase difference of the MEASURE and REFERENCE signals, and the result is proportional to cumulative displacement. See, U.S. Pat. No. 3,458,259, "Interferometric System", issued July 29, 1969, and U.S. Pat. No. 3,656,853, "Interferometric System", issued Apr. 18, 1972.

Conventional laser interferometers employ remote receivers to perform frequency mixing, detection, amplifying, and cable transmission functions in a single package. One receiver is required for each measurement axis.

FIG. 2 shows a schematic diagram of a conventional integrated receiver 14, known in the prior art. The combined laser beam returning from the interferometer enters the receiver through the lens 21, then passes through the mixing polarizer 23 which mixes the two beam components, producing interference fringes. The light beam is focused onto the detector photodiode 25 which converts the light into an electrical signal. The output of the detector is applied to an amplifier 27 and a line driver 29 to produce the signal for the measurement electronics.

Such conventional integrated receivers suffer several disadvantages:

Heat dissipation. Due to the use of electronic detection, amplifying, and cable transmission commercial remote receivers generate heat that can adversely affect the nearby measurement. This effect can be reduced by mounting the receiver sufficiently far away from the measurement, but this isn't always convenient or practical.

Size and Volume. Present receivers occupy approximately 5 cubic inches. In many applications it is difficult to find the room for a receiver of this size.

EMI considerations. Present receivers employ electronic signal transmission over a cable between the receiver and the measurement electronics. In present commercial AC interferometers these signals are in the range of 100 kHz to 25 MHz. Without careful design, the signal from the receiver is susceptible to noise from ambient electromagnetic interference, especially when the receiver is separated from the measurement electronics by great distances. Also, the potential for electromagnetic interference from the receiver exists.

An object of the invention is to provide a remote receiver for laser interferometer systems that overcomes the disadvantages of conventional receivers discussed above.

In the preferred embodiment of the invention, the receiver is split into two parts connected by a fiber optic link. The front-end of the receiver, located near the remote interferometer optics, houses only the optical components for focusing and combining the laser beam components, and transmits the combined beam through an optical fiber cable. The back-end of the receiver, located remotely, houses the electronic components for detecting and measuring the frequency difference to produce the signal for the measurement electronics.

Such a receiver offers the following advantages:

No heat dissipation. Since the receiver front-end (lens, polarizer, and fiber) are all passive devices, there will be no heat generated in the vicinity of the measurement.

Small size. The receiver front-end can be packaged in a small cube about ¾ inch on a side because it houses only the optical components.

No EMI radiation or susceptibility. Using a fiber optic cable to carry the displacement information to remotely mounted electronics allows shorter electrical cabling, reducing the system's EMI susceptibility and radiation.

DETAILED DESCRIPTION OF THE INVENTION

Figure 1:
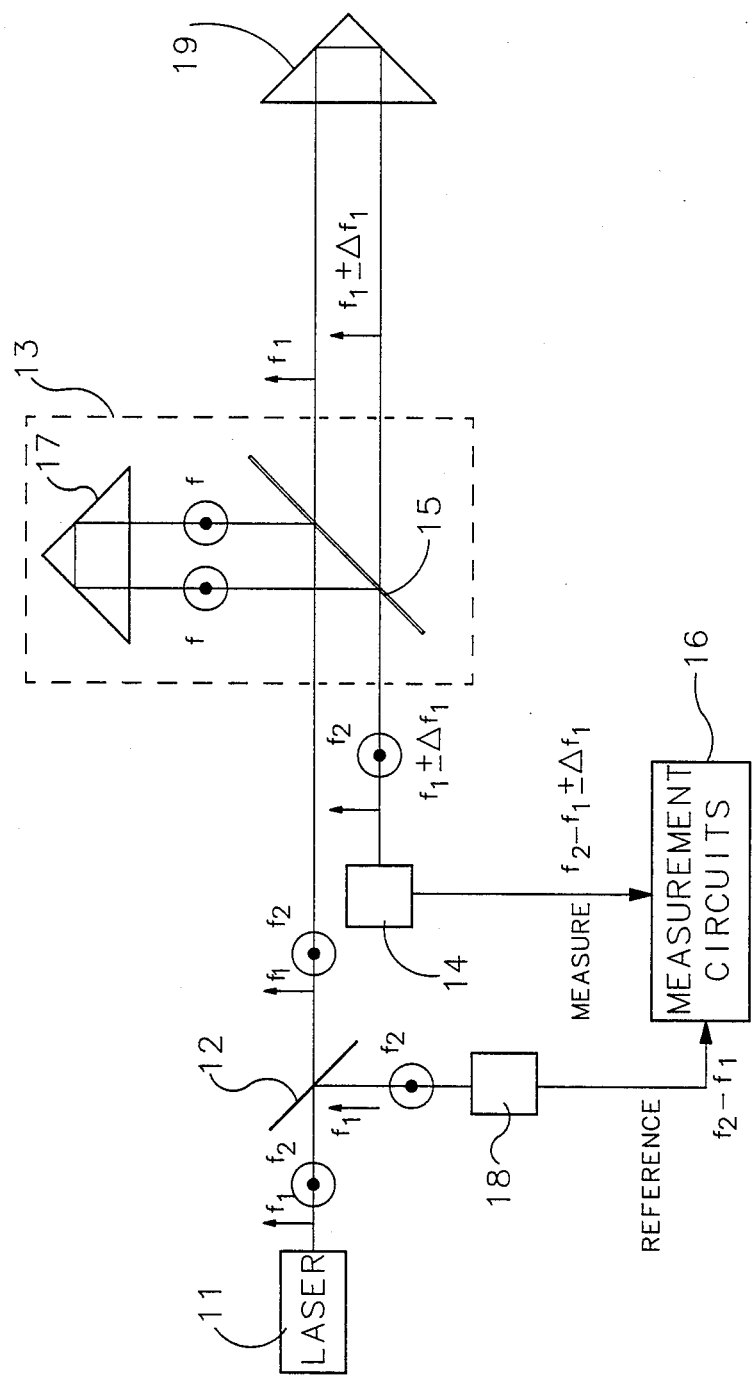
FIG. 1 shows a typial block diagram for an AC laser interferometer system, suitable for use with the receiver of the invention.
Figure 2:
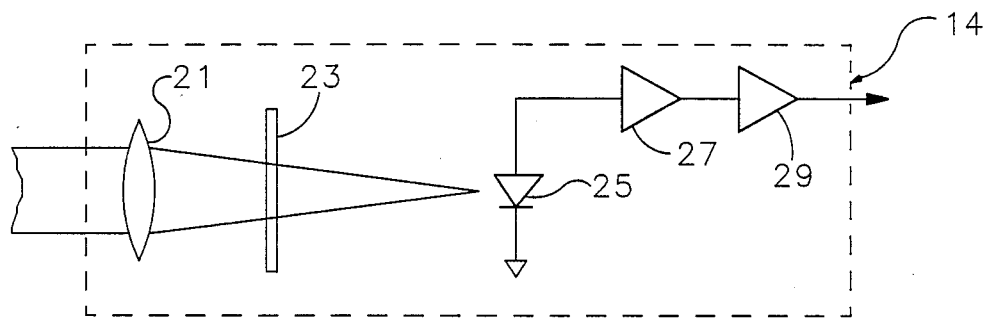
FIG. 2 shows a schematic diagram of a conventional integrated receiver for a laser interferometer system.

The preferred embodiment of the fiber optic based remote receiver of the invention operates in combination with an AC interferometer of the type illustrated in FIG. 1. To more clearly explain the operation of the receiver of the invention, a brief explanation of the operation of the interferometer of FIG. 1 follows.

Laser head 11 produces a laser beam with two frequency components, $f_1$ and $f_2$, having orthogonal polarization states. The beam is split at a polarizing beam splitter surface 15 in the remote interferometer 13. One component, with frequency $f_2$, is reflected to a reflector 17, and the other component, with frequency $f_1$, is transmitted toward a reflector 19. Typically, reflector 17 is fixed and reflector 19 is mounted on the object whose movement is to be measured.

When one reflector is moved, or displaced, relative to the other, a doppler shift is introduced into that beam's frequency. If reflector 19 moves, the beam returning to the interferometer is at frequency $f_1 \pm \Delta f_1$. The magnitude of this doppler shift is proportional to the speed at which the reflector is moving relative to the fixed reflector.

Each beam is then directed back to the interferometer 13 and recombined as a single coaxial beam at the polarizing beam splitter surface 15. This combined beam is sent to a fiber optic measurement receiver 14 which mixes the two beam components (frequencies) and produces a signal representative of the difference of the two frequencies. This difference signal is amplified and sent to the measurement electronics 16 as the MEASURE signal.

A portion of the original laser beam is sampled by beam splitter 12, and directed to reference receiver 18, which mixes the two beam components and produces a signal called the REFERENCE signal, which is sent to the measurement electronics.

The measurement electronics compares the cumulative phase difference of the MEASURE and REFERENCE signals, and the result is proportional to the cumulative displacement of reflector 19. Electronic circuits that are suitable for this function are shown in U.S. Pat. No. 3,458,259, "Interferometric System", issued July 29, 1969, and U.S. Pat. No. 3,656,853, "Interferometric System", issued Apr. 18, 1972, which are hereby incorporated by reference.

Figure 3:
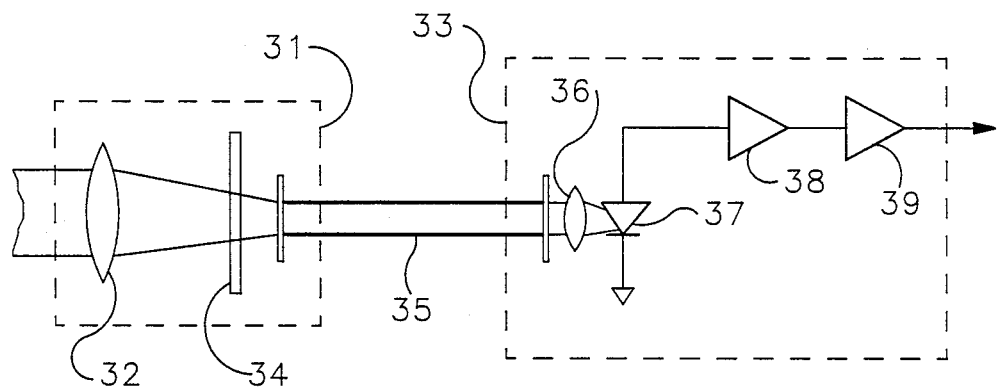
FIG. 3 shows a schematic diagram of the fiber optic receiver of the invention.

FIG. 3 shows a schematic diagram of the fiber optic based remote receiver of the invention. The receiver comprises a front-end 31 and a back-end 33, connected by an optical fiber 35.

The front-end 31 of the fiber optic receiver is comprised of three main parts: an input lens 32, a mixing polarizer 34, and an optical fiber 35. The two-frequency beam returning from the interferometer enters the receiver front end through the lens 32, which is a converging type, then passes through the mixing polarizer 34 which combines the two beam components, producing amplitude modulated light at the difference frequency.

Although the exact placement of polarizer 34 is not critical, it is important that polarization combining occurs before the light enters the optical fiber 35 to ensure that amplitude modulated light is sent down the fiber. If the light polarizations are not combined before the beam enters the optical fiber 35, it would be difficult to produce the amplitude modulated light reliably at a later point because the beam components' polarization state and wave fronts are generally not preserved through the length of the optical fiber. Thus, the polarizer 34 may be located between the lens 32 and its focal plane as shown in FIG. 3, or alternatively, the polarizer may be mounted as a separate component from front-end 31, in the path of the laser beam from the interferometer 13, before the beam reaches lens 32.

The light which emerges from optical fiber 35 at the back-end 33 is amplitude modulated light. As it leaves the fiber, the light is focused by lens 36 onto the detector photodiode 37 which is part of a conventional detector circuit, including an amplifier 38 and a line driver 39. The detector circuit produces the signal for the measurement electronics. Depending on the fiber diameter chosen and the active area of the photodiode, lens 36 may not be required.

Figure 4:
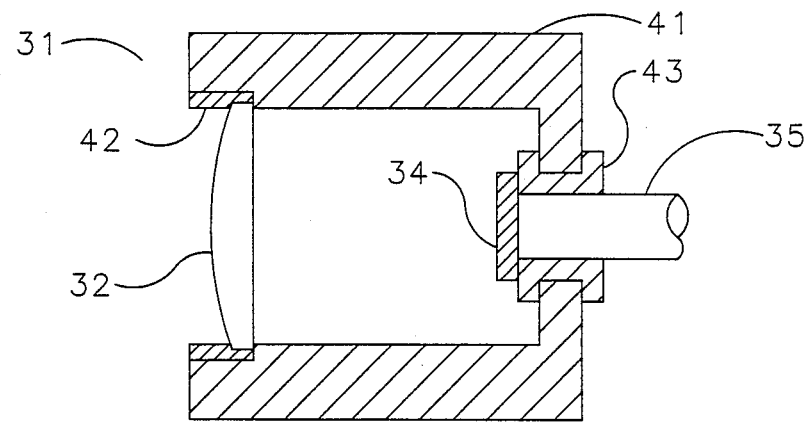
FIG. 4 is a more detailed cross sectional view of the front-end of the fiber optic receiver of the invention.

FIG. 4 is a more detailed cross sectional view of the front-end 31. The input lens 32 is secured at one end of a housing 41 by any suitable means, such as a bezel 42. Optical fiber 35 is secured to the opposite end of the housing 41 by any suitable means such as grommet 43. In the preferred embodiment, the mixing polarizer 34 is glued to the end of the optical fiber 35.

Because the optical fiber is used as a light pipe, single-mode or multi-mode transmission is equally acceptable. Use of a relatively thick (eg. 1 mm diameter) optical fiber allows easier alignment of the focused laser beam to the fiber, making the placement of the fiber relative to the lens less critical, and greatly reducing the angular alignment tolerance for the front-end 31 with respect to the incoming laser beam from the interferometer.

We claim:

1. A remote receiver for a two-frequency laser interferometer, comprising:
   a front-end section for receiving a light beam from the interferometer, comprising means for combining the two frequency components to form a combined light beam, means for focusing the light beam and directing the light beam to an optical output port;
   a back-end section comprising an optical input port for receiving a light beam and means responsive to amplitude modulation of the light beam for producing an electrical signal representative of the difference in frequency between the two frequency components; and
   an optical fiber connecting the output port of the front-end section to the input port of the back-end section, for transmitting the light beam from the front-end section to the back-end section.

2. The apparatus of claim 1 wherein the optical fiber has a diameter in the range of 0.5 mm to 1.5 mm.

3. The apparatus of claim 1 wherein the front-end section is mounted on the interferometer.

4. The apparatus of claim 1 wherein the front-end section further comprises a lens for focusing the light beam, and the combining means comprises a mixing polarizer mounted between the lens and the output port.

* * * * *